United States Patent [19]
Heitzmann

[11] Patent Number: 5,899,470
[45] Date of Patent: May 4, 1999

[54] RUBBER SPRING MODULAR WHEEL SUSPENSION FOR VEHICLES

[75] Inventor: David E. Heitzmann, Union, Mich.

[73] Assignee: MOR/ryde International, Inc., Elkhart, Ind.

[21] Appl. No.: 08/886,593

[22] Filed: Jul. 1, 1997

[51] Int. Cl.[6] .............................. B60G 3/14; B60G 11/22; B62D 17/00
[52] U.S. Cl. ........................... 280/86.751; 280/86.75; 280/124.128; 280/124.178; 267/257
[58] Field of Search ................ 280/124.116, 124.128, 280/124.13, 124.132, 124.177, 124.178, 687, 86.75, 86.751, 86.753; 267/257

[56] References Cited

U.S. PATENT DOCUMENTS

| | | | |
|---|---|---|---|
| 2,147,518 | 2/1939 | Boxen | 267/257 |
| 3,692,326 | 9/1972 | Hickman | 280/124.178 |
| 3,768,827 | 10/1973 | Hickman | 280/124.177 |
| 3,794,343 | 2/1974 | Hickman | 280/124.128 |
| 3,830,516 | 8/1974 | Hickman | 280/124.132 |
| 4,199,166 | 4/1980 | Bohmer | 280/86.751 |
| 4,995,636 | 2/1991 | Hall et al. | 280/124.116 |
| 5,150,918 | 9/1992 | Heitzmann | 280/86.5 |
| 5,465,997 | 11/1995 | Heitzmann | 280/124.177 |

*Primary Examiner*—Peter C. English
*Attorney, Agent, or Firm*—Joseph P. Gastel

[57] ABSTRACT

A modular wheel suspension includes a frame mounting plate having a central support member affixed thereto. The central support member mounts a pivot shaft bracket support. A pivot shaft bracket is adjustably mounted on the pivot shaft bracket support. The pivot shaft bracket pivotally mounts a shaft which is connected to one end of a beam arm, the other end of which mounts a wheel axle on which a wheel is mounted. A rubber shear spring is mounted between the beam arm and a portion of the frame mounting plate. The adjustable mounting of the pivot shaft bracket provides for toe and camber adjustment of the wheel.

39 Claims, 8 Drawing Sheets

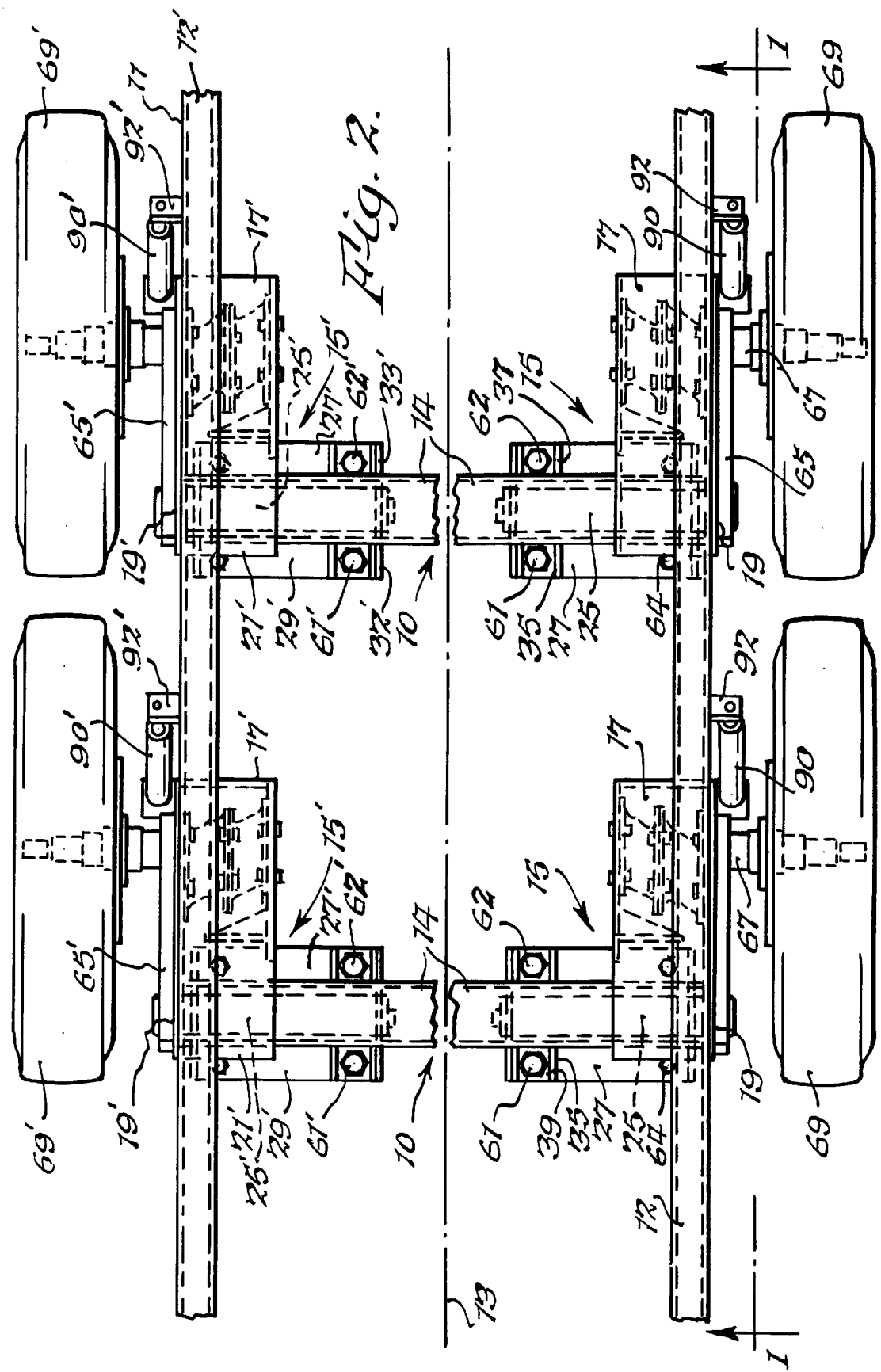

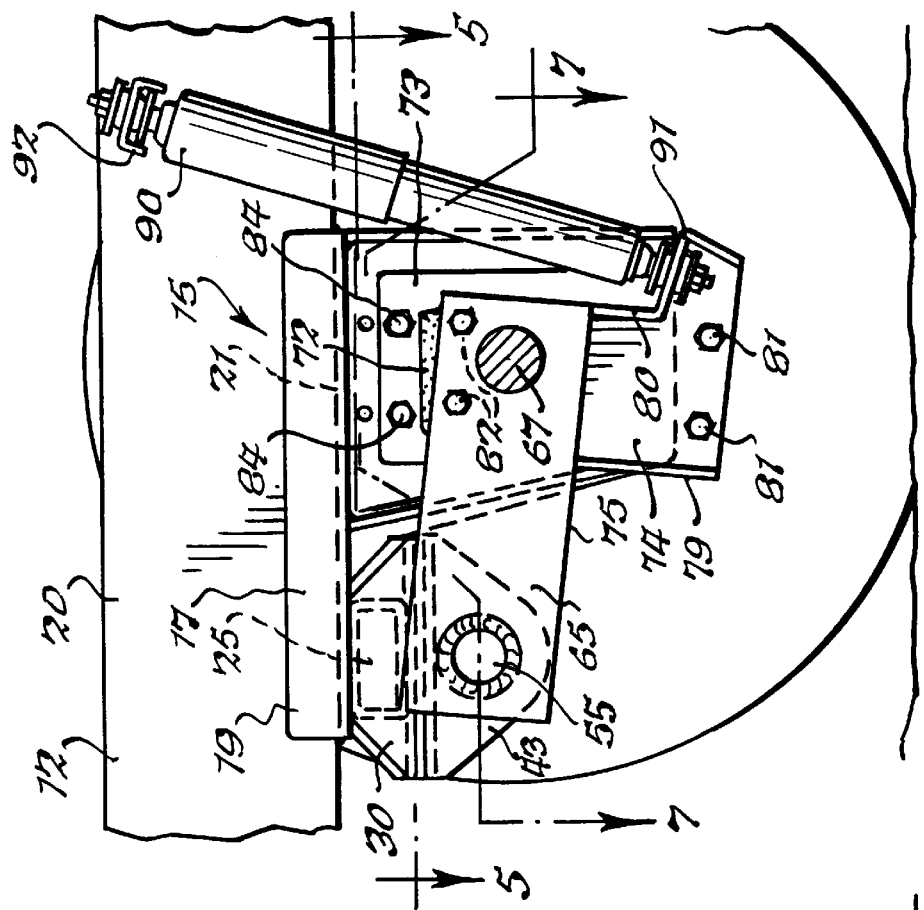
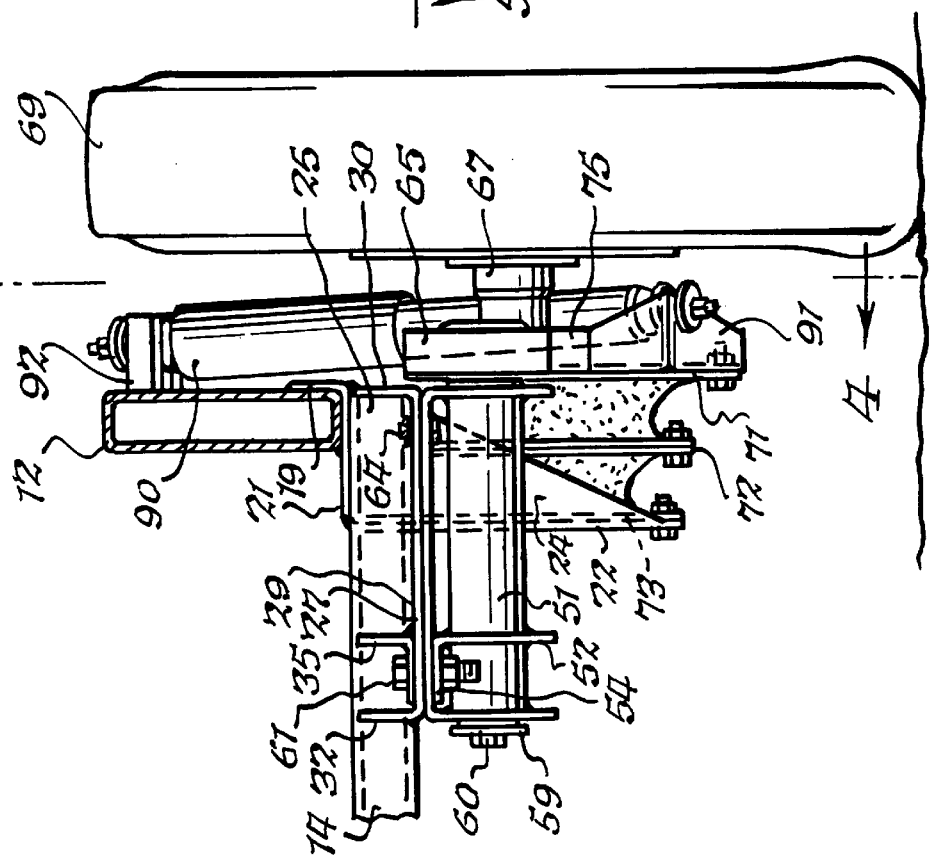

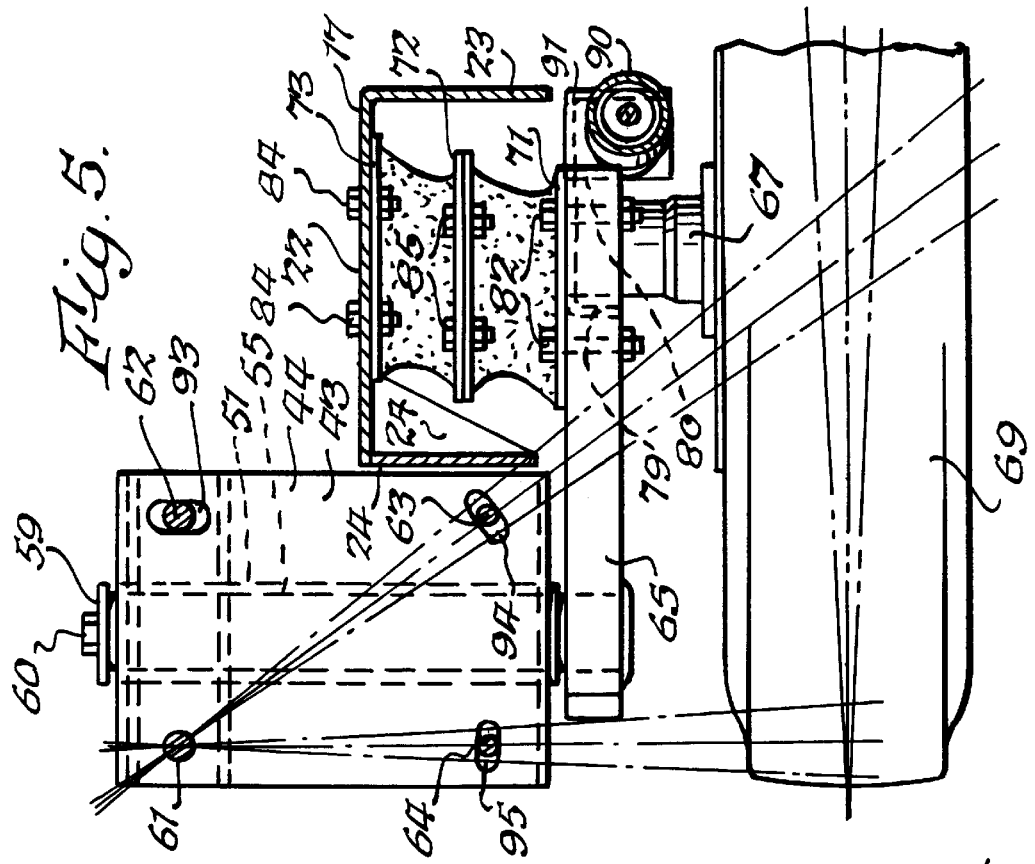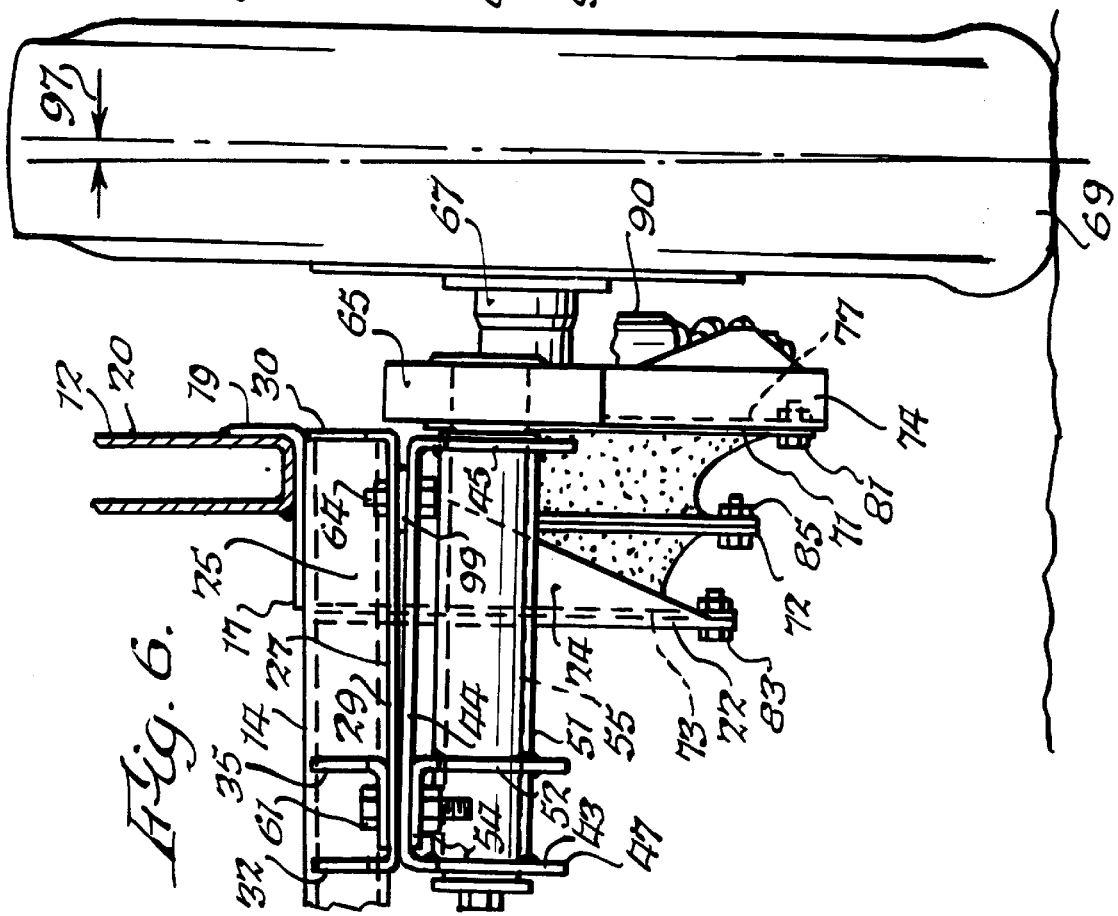

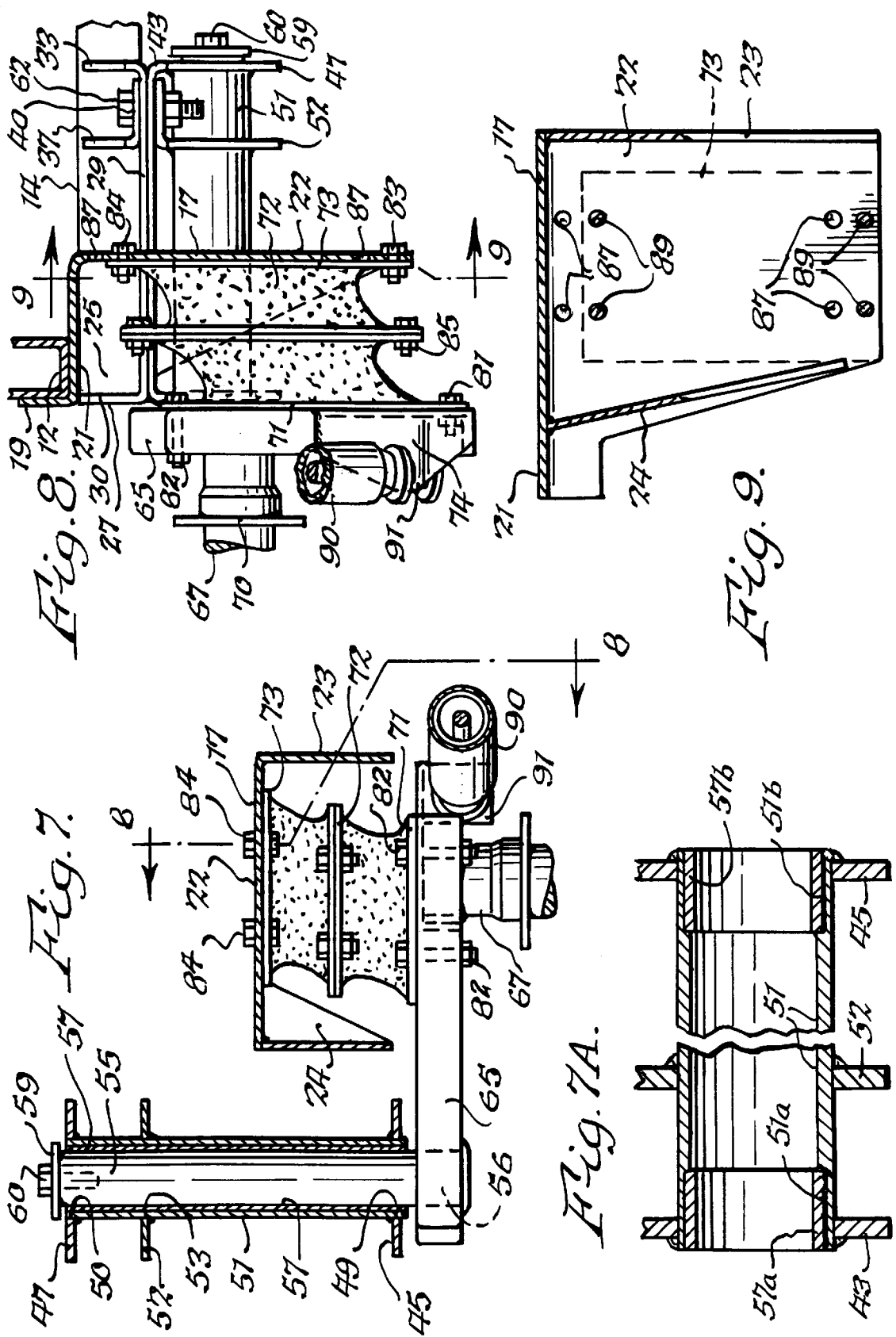

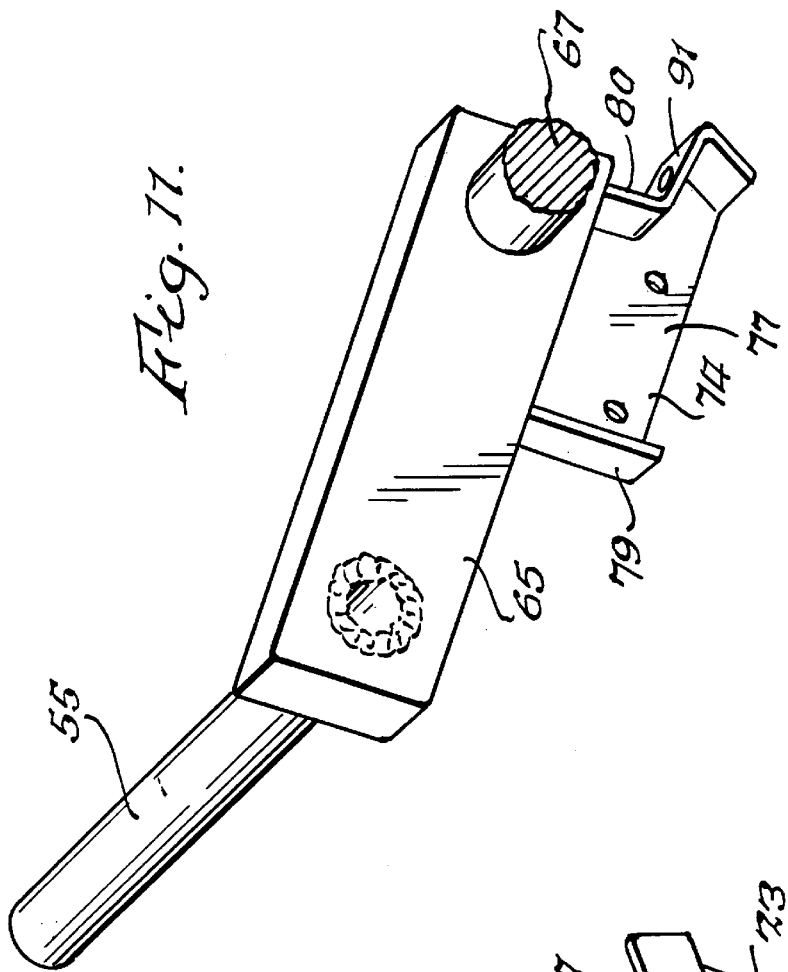
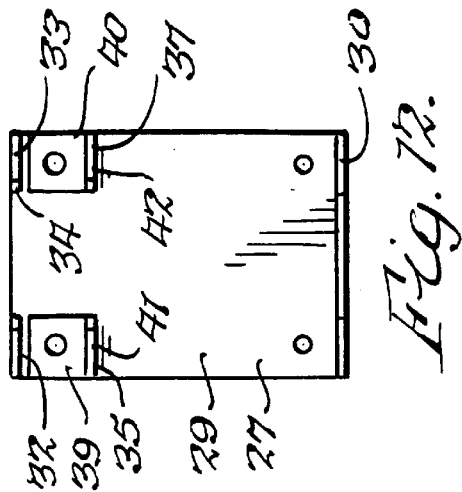
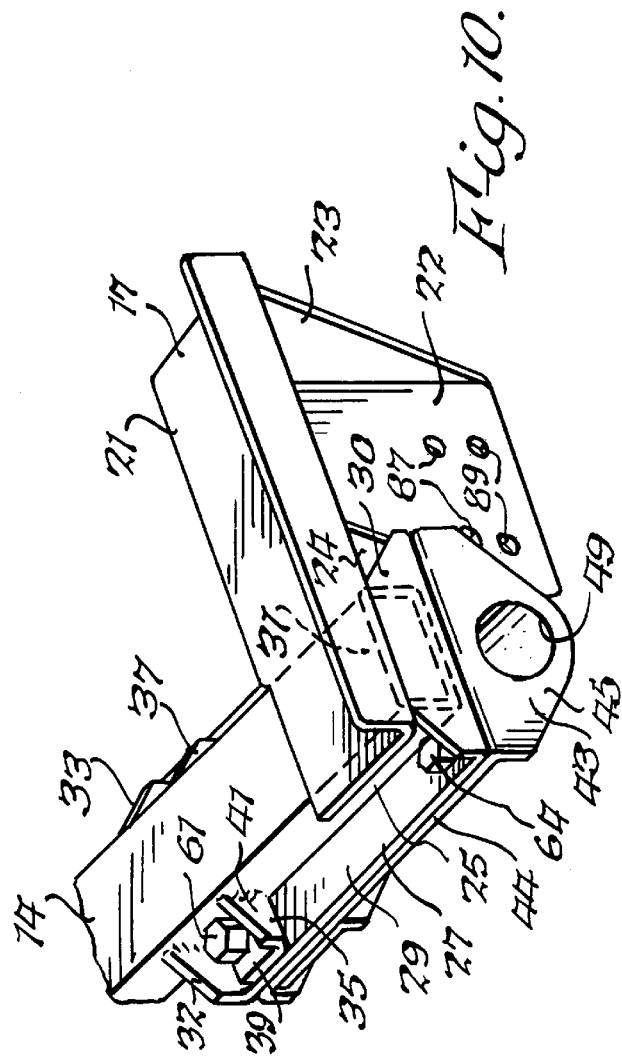

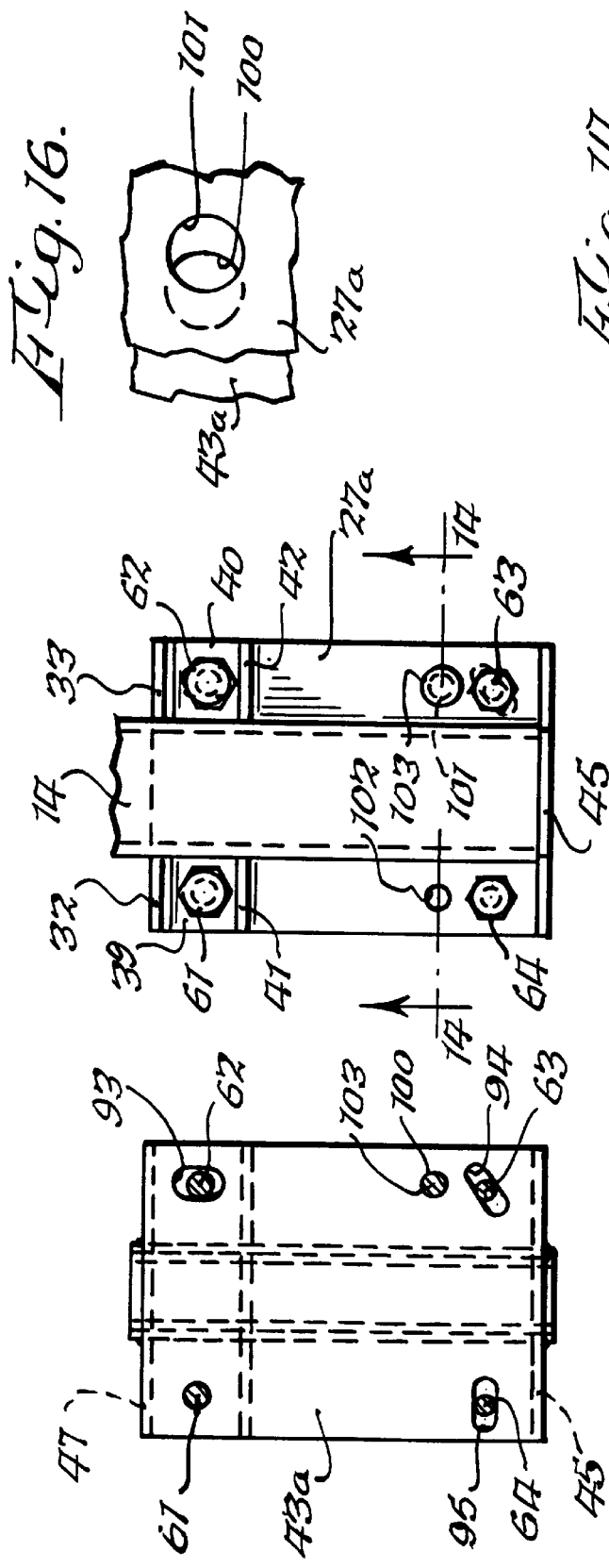
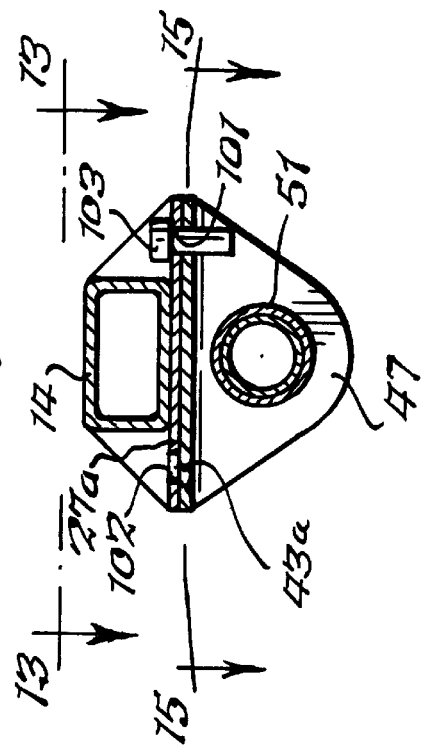

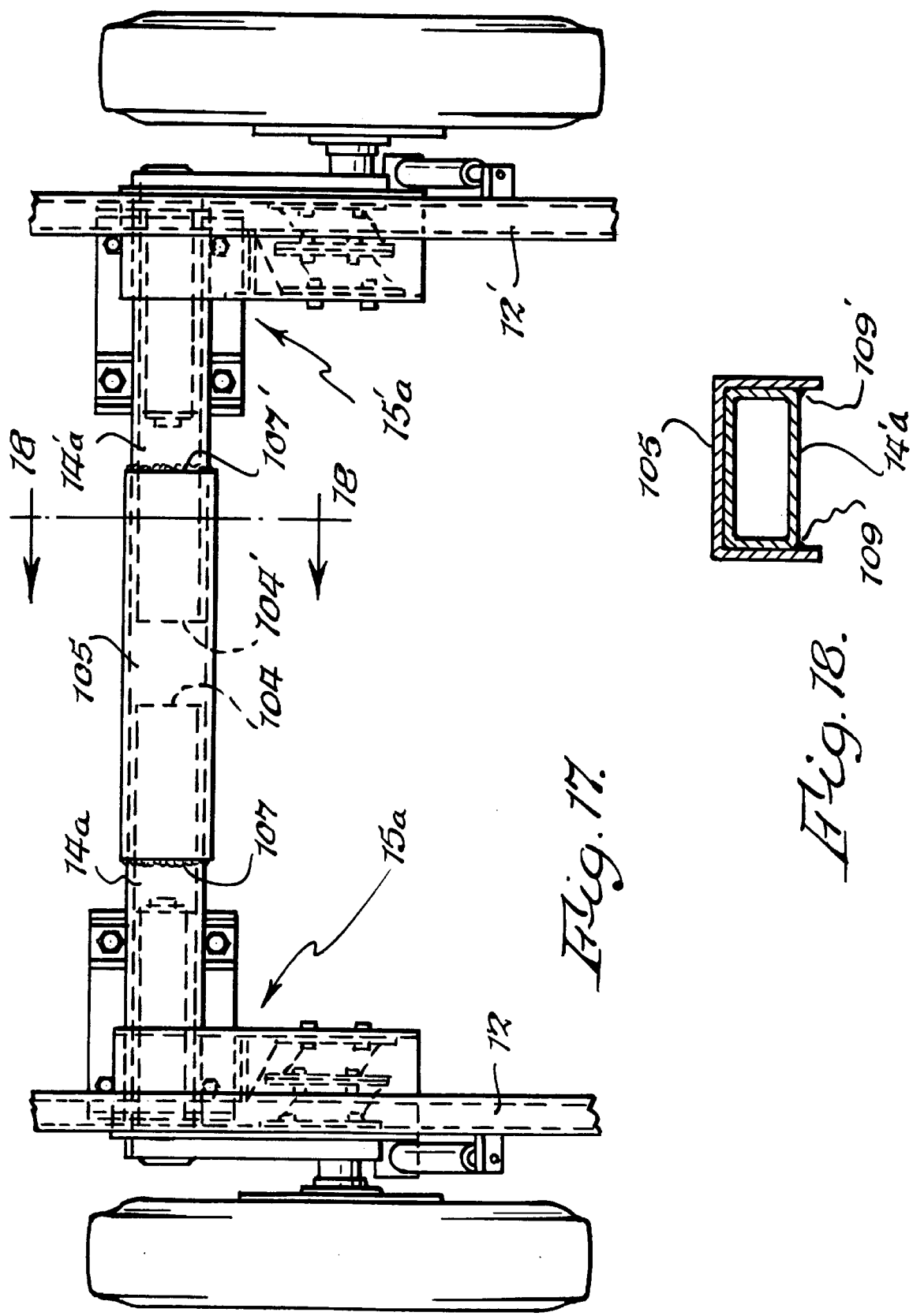

RUBBER SPRING MODULAR WHEEL SUSPENSION FOR VEHICLES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a modular wheel suspension for vehicles.

There are numerous modular wheel suspensions for vehicles in existence. However, in certain of these suspensions the wheels on opposite sides of the vehicle were linked by a common axle, that is, they were not independently suspended. Furthermore, insofar as known, modular suspensions did not have convenient toe-in and camber adjustments nor could they be adjusted for height relative to the frame of the vehicle on which they were mounted.

BRIEF SUMMARY OF THE INVENTION

It is accordingly one object of the present invention for providing an improved modular wheel suspension which has a toe adjustment and a camber adjustment.

It is another object of the present invention to provide an improved modular wheel suspension for a vehicle in which the wheels on opposite sides of the vehicle are totally independent of each other in that they are not mounted on the same axle.

A further object is to provide an improved modular suspension for a vehicle in which each of the wheels can have an independent height adjustment.

Yet another object of the present invention is to provide an improved modular suspension employing rubber springs. Other objects and attendant advantages will readily be perceived hereafter.

The present invention relates to a modular wheel suspension comprising a frame mounting plate, a pivot shaft bracket support mounted on said frame mounting plate, a pivot shaft bracket mounted on said pivot shaft bracket support, a shaft pivotally mounted on said pivot shaft bracket, a beam arm having a first end mounted on said shaft, a rubber spring having a first side mounted on said frame mounting plate and a second side mounted on said beam arm, and an axle extending outwardly from a second end of said beam arm on the opposite side of said beam arm from said rubber spring.

The present invention also relates to a modular wheel suspension assembly in a vehicle having first and second spaced frame members, said modular wheel suspension assembly comprising first and second frame mounting plates mounted on said first and second frame members, respectively, first and second central support members affixed to said first and second frame mounting plates, respectively, first and second pivot shaft bracket supports mounted on said first and second central support members, respectively, first and second pivot shaft brackets mounted on said first and second pivot shaft bracket supports, respectively, first and second shafts pivotally mounted on said first and second pivot shaft brackets, respectively, first and second beam arms mounted on said first and second shafts, respectively, a first rubber spring mounted between said first frame mounting plate and said first beam arm, a second rubber spring mounted between said second frame mounting plate and said second beam arm, first and second axles extending outwardly from said first and second beam arms, respectively, and a cross bracket member fixedly secured to said first and second central support members.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 2 is a fragmentary plan view taken substantially in the direction of arrows 2—2 of FIG. 1;

FIG. 3 is a fragmentary cross sectional view taken substantially along line 3—3 of FIG. 1;

FIG. 4 is a fragmentary cross sectional view taken substantially along line 4—4 of FIG. 3;

FIG. 5 is a fragmentary cross sectional view taken substantially along line 5—5 of FIG. 4 and showing the toe adjusting structure for the modular wheel suspension;

FIG. 6 is a fragmentary enlarged cross sectional view similar to FIG. 3 but showing the shim arrangement for adjusting the camber;

FIG. 7 is a cross sectional view taken substantially along line 7—7 of FIG. 4;

FIG. 7A is a fragmentary cross sectional view showing a preferred structure for mounting the pivot shaft for the beam arm;

FIG. 8 is a fragmentary view, partially in cross section, taken substantially along line 8—8 of FIG. 7;

FIG. 9 is a cross sectional view taken substantially along line 9—9 of FIG. 8;

FIG. 10 is a fragmentary perspective view of a portion of the modular wheel suspension;

FIG. 11 is a fragmentary perspective view of another portion of the modular wheel suspension;

FIG. 12 is a plan view of the pivot shaft bracket support;

FIG. 13 is a fragmentary plan view of a modified form of the structure showing an alignment pin for aligning the pivot shaft bracket with the pivot shaft bracket support;

FIG. 14 is a cross sectional view taken substantially along line 14—14 of FIG. 13;

FIG. 15 is a cross sectional view taken substantially along line 15—15 of FIG. 14;

FIG. 16 is a fragmentary schematic view exemplifying the manner in which the toe adjustment can be measured;

FIG. 17 is a fragmentary plan view of a modified embodiment of the present invention; and FIG. 18 is a cross sectional view taken substantially along line 18—18 of FIG. 17.

DETAILED DESCRIPTION OF THE INVENTION

Figure 1:
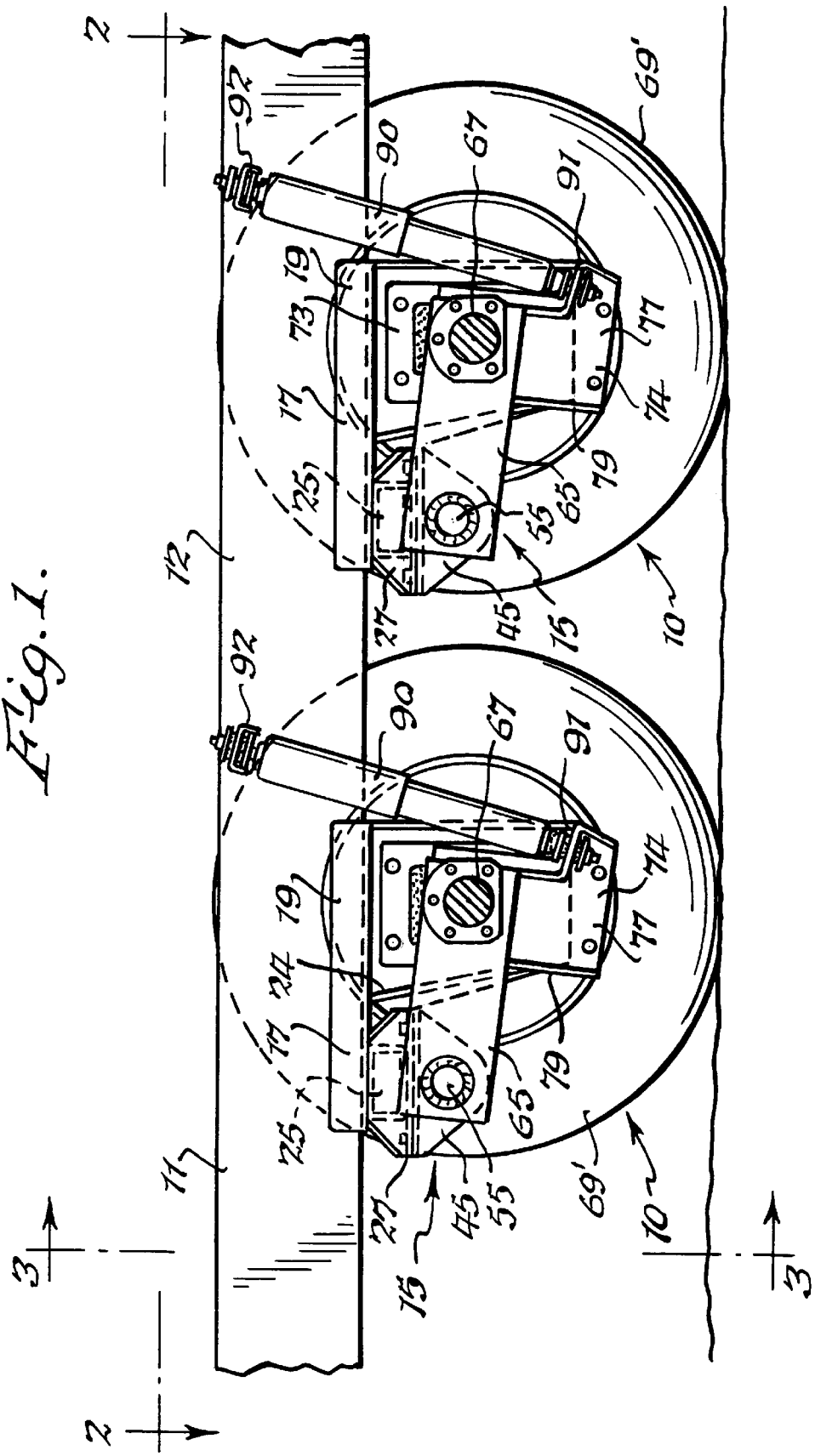
FIG. 1 is a fragmentary cross sectional side elevational view taken substantially along line 1—1 of FIG. 2 and showing a plurality of modular wheel suspension assemblies mounted on the frame of a vehicle.

A pair of modular suspension assemblies 10 are shown in FIG. 2 mounted on the frame 11 of a vehicle such as a towable trailer or motor home or any other suitable type of vehicle. The vehicle frame 11 comprises rails 12 and 12' on opposite sides of the vehicle centerline 13. To facilitate the description, the parts of the structure below centerline 13 in FIG. 2 will be designated by unprimed numerals and the parts above centerline 13, which are mirror image counterparts of the parts below centerline 13, will be designated by corresponding primed numerals. The only exception is that the central support member or cross brace will be designated by a single unprimed numeral 14. By virtue of the foregoing nomenclature system, there will be no need to physically describe the structure above centerline 13 because it will be understood that it comprises mirror image counterparts of the structure below centerline 13. Additionally, it will be noted that the description in FIGS. 1 and 3–11 specifically describe the structure below centerline 13.

Each modular suspension assembly 10 includes wheel support structures 15 and 15' which are connected to each other by central support member 14. The assembly consisting of wheel support structures 15 and 15' connected by central support member 14 is intended to be mounted on vehicle rails 12 and 12'. The foregoing assembly can be supplied for mounting as original equipment or can be supplied for replacement of other types of suspensions in the field. Additionally, wheel support structures, analogous to 15 and 15', which are not connected by a central support member, such as 14, can be supplied for individual mounting in the field and a modified form of central support member structure can be supplied to couple two individual wheel support structures, as described relative to FIGS. 17 and 18.

Each wheel support structure 15 includes a frame mounting plate 17 having a flange 19 which is placed in contiguous relationship to the outer surface 20 of rail 12. Frame mounting plate 17 also includes a horizontal portion 21 which underlies rail 12 and is welded thereto. Additionally, frame mounting plate 17 includes a vertical plate portion 22 (FIG. 9) which extends downwardly from horizontal portion 21. Gussets 23 and 24 have their upper portions welded to the underside of horizontal portion 21 and their vertical portions welded to vertical plate portion 22 of mounting plate 17 to thereby rigidize mounting plate 17.

Central support member 14 is of hollow rectangular form, and its outer end portion 25 is welded to the underside of horizontal portion 21 (FIGS. 3 and 10) of frame mounting plate 17. The fact that the end portions 25 and 25' of central support member 14 are welded, as described, to mounting plates 17 and 17' rigidizes the rails 12 and 12', respectively, against bowing. A pivot shaft bracket support 27 (FIG. 10) includes a central horizontal portion 29 and a bent-up trapezoidal end 30 to which the extreme end 31 of end portion 25 of central support member 14 is welded. The opposite end of pivot shaft bracket support 27 is folded up into triangles 32 and 33 (FIGS. 2, 10 and 12) with a space 34 therebetween through which central support member 14 passes, and to the edges of which it is welded. End portion 25 of central support member 14 is also welded to the top of horizontal portion 29 of pivot shaft bracket support 27. Gusset brackets 35 and 37 are mirror image counterparts and have horizontal portions 39 and 40, respectively, which are welded to the horizontal portion 29 of pivot shaft bracket support 27, and they include upturned triangular portions 41 and 42, respectively, which are welded to the sides of central support member 14.

A pivot shaft bracket 43 includes a central horizontal portion 44 and downwardly bent ends 45 and 47 having apertures 49 and 50, respectively, (FIGS. 7 and 10) into which the ends of pivot shaft tube 51 are welded. A bracket 52 (FIGS. 3, 6, 7 and 8) includes a bore 53 therein through which pivot shaft tube 51 passes. The base 54 of bracket 52 is welded to the underside of horizontal portion 44 of pivot shaft bracket 43. A shaft 55 (FIGS. 7 and 11) is preferably journaled in pivot shaft tube 51 with fiber wrapped TEFLON lined bearings 57a and 57b (FIG. 7A) which are obtainable under the trademark REXNORD. These bearings are cylindrical members ⅝" long located at the opposite ends of pivot shaft tube 51 and retained therein by press fits in counterbored ends 51a and 51b. Any other suitable bearings may be used, and FIG. 7 portrays the bearing 57 as a continuous member as another embodiment. A disc 59 is secured to the end of shaft 55 by bolt 60 to prevent the shaft 55 from migrating downwardly in FIG. 7. Pivot shaft bracket 43 is adjustably secured to pivot shaft bracket support 27 by a plurality of bolts 61, 62, 63 and 64 (FIG. 5) to permit toe and camber adjustments, as will be described in greater detail hereafter.

A beam arm 65, which is a solid rectangular block of steel, has one end with a bore therein which receives end 56 (FIG. 7) of shaft 55, and beam arm 65 is welded onto the outer end 56 of shaft 55. The opposite end of beam arm 65 has a stub shaft 67 having its end in a bore in beam arm 65 and stub shaft 67 is welded to beam arm 65 and extends outwardly there-from for serving as an axle for wheel 69. The end of beam 65 is also secured to mounting plate 71 of rubber shear spring 72 having its opposite mounting plate 73 mounted on vertical side portion 22 of frame mounting plate 17. More specifically, a bracket 74 (FIGS. 1 and 11) is welded to the underside 75 of beam arm 65. Bracket 74 includes a rear planar portion 77 and flanges 79 and 80. The lower portion of rubber spring mounting plate 71 is bolted to bracket portion 77 by bolts 81 (FIG. 4). The upper portion of plate 71 is bolted directly to beam arm 65 by bolts 82 (FIGS. 4 and 5). The plate 73 of rubber shear spring 72 is bolted to vertical side portion 22 of frame mounting plate 17 by lower bolts 83 and upper bolts 84. The adjacent plates of the two sections of rubber shear spring 72 are bolted to each other by bolts 85.

At this point it is to be noted from FIG. 9 that vertical plate portion 22 of frame mounting plate 17 has two sets of four holes, namely, an upper set of four holes 87 and a lower set of four holes 89. The purpose of having two sets of holes 87 and 89 is so that elevation of stub shaft 67 can be adjusted by mounting plate 73 on either the set of lower holes 89 or the set of upper holes 87. A shock absorber 90 has its lower end mounted on flange 91 (FIG. 11) of bracket 74 and its upper end is mounted on bracket 92 welded to rail 12. It can thus be seen that as the vehicle travels over a road, beam arm 65 will pivot about the axis of shaft 55 as opposed by rubber spring 72 and shock absorber 90.

Further in accordance with the present invention, the toe and camber of each wheel 69 can be adjusted. In this respect, to adjust the toe, as depicted in FIG. 5, it is merely necessary to loosen bolts 61, 62, 63 and 64 which join pivot shaft bracket support 27 and pivot shaft bracket 43. Bolt 61 passes through aligned apertures in portions 44 and 29 of members 43 and 27, respectively, with very little clearance so that when all of the four bolts are loosened, pivot shaft bracket 43 can pivot in a substantially parallel direction relative to pivot shaft bracket support 27 about the axis of bolt 61. This is permitted because bolts 62, 63 and 64 are located in enlarged slots 93, 94 and 95, respectively, of plate portion 44 of pivot shaft bracket 43. Thus, if pivot shaft bracket 43 is pivoted in a clockwise direction about the axis of bolt 61 in FIG. 5, there will be more toe-in, and if it is pivoted in a counterclockwise direction, there will be more toe-out. After the proper toe adjustment has been made, bolts 61, 62, 63 and 64 are tightened. It will be appreciated that the apertures in pivot shaft bracket support 27 are preferably of a size to accommodate bolts 61, 62, 63 and 64 with very little clearance or the holes can be larger to permit the bolts to shift therein. It is only necessary that the apertures in plate portions 43 and 29 which receive bolt 61 have very little clearance so that pivoting can be about the axis of bolt 61.

The camber of the wheel 69 can be adjusted as depicted in FIG. 6. In this respect, if the camber is to be adjusted by the amount indicated by arrows 97, it is only necessary to place shims, such as 99, between plate portions 29 and 44 at the locations of bolts 64 and 63 or, alternatively, an elongated strip of metal with apertures therein can be placed along the axis joining bolts 63 and 64. While not shown, if it is desired to adjust the camber in an opposite direction from that indicated in FIG. 6, suitable shims can be placed between plates 29 and 44 at bolts 61 and 62. Thus, the camber can be adjusted by changing the inclination of pivot shaft bracket 43 relative to pivot shaft bracket support 27. While not shown in the drawings, the hole 49 (FIG. 10) in end 45 of bracket 43 may be lower than hole 50 (FIG. 7) in end 47 of bracket 43 so as to provide a preadjusted camber.

In FIGS. 13–16 a modified embodiment of the present invention is disclosed wherein the pivot shaft bracket support 27a and the pivot shaft bracket 43a have an alignment mechanism associated therewith for both initially assembling them and for providing a gauge for the toe adjustment. Pivot shaft bracket 43a is identical in all respects to pivot shaft bracket 43 except that it has an aperture 100 therein. Pivot shaft bracket support 27a is identical to pivot shaft bracket support 27 except that it has two holes 101 and 102 therein. Additionally, the remainder of the associated parts of parts 27a and 43a are identical to those described above relative to FIGS. 1–12 and like numerals will be applied thereto without any additional description.

To initially align pivot shaft bracket 43a with pivot shaft bracket support 27a, it is merely necessary to align aperture 100 with aperture 101 and slip a pin 103 therethrough. This will align the pivot shaft bracket 43a with zero toe adjustment and thereafter bolts 61, 62, 63 and 64 can be tightened down. The pin 103 can thereafter be removed.

The apertures 100 and 101 can be used to make the toe adjustment, as schematically depicted in FIG. 16. In this respect, a quarter of a hole overlap is approximately 1° of toe. Therefore, if the pivot shaft bracket 43a is moved to the position shown in FIG. 16 wherein aperture 100 overlaps aperture 101 by about one-half, this would amount to a 2° toe adjustment. If there was only a one-quarter overlap, there would be a 3° toe adjustment, and if the apertures 100 and 101 were tangential, there would be a 4° toe adjustment. It will be appreciated that whether the adjustment is a toe in or a toe out would depend on whether aperture 100 is moved to the left of aperture 101 or whether it is moved to the right.

It will be noted that pivot shaft bracket support 27a has two alignment holes 101 and 102 for use with the pivot shaft bracket 43a on opposite sides of the vehicle. However, pivot shaft bracket 43a need only have a single hole 100 because the ends 45 and 47 are identical, and thus it can be formed into a right or left depending on which side of the central portion the ends 45 and 47 are bent. Thus, the pin 103 will always pass through aligned apertures adjacent slot 94. It will also be noted that bolt 61 is the farthest from the wheel 69 to provide the longest lever arm for adjustment.

In FIGS. 17 and 18 a further modification of the present invention is disclosed wherein wheel support structures 15a and 15'a correspond to wheel support structures 15 and 15', respectively. The only difference between wheel support structure 15a and wheel support structure 15 is that the central support members 14a and 14'a are separate and not continuous, as is central support member 14 of FIG. 2. More specifically, central support member 14a is an elongated tubular member which terminates at 104, and central support member 14'a is an elongated tubular member which terminates at 104'. Thus, wheel support structures 15a and 15'a are separate members and they can be joined to each other by a central coupling member in the form of a channel 105 which is welded to central support members 14a and 14'a as shown at areas 107 and 107' and 109 and 109', that is, wherever the channel 105 and central support members 14a and 14'a have adjacent portions which provide locations for welded seams. It will be appreciated that the central coupling member can take other forms, such as rectangular tube. The advantage of the foregoing structure is that the wheel support structures 15a and 15'a can be spaced apart any amount which is required by the distance between vehicle rails 12 and 12' because of the adjustability provided by the channel 105 in conjunction with central support members 14a and 14'a. In other words, when the exact spacing between rails 12 and 12' in FIG. 2 is known, the wheel support structures 15 and 15' can be secured to each other by a single central support member 14 as in FIG. 2. However, in the field, where a spacing between wheel support structure 15a and 15'a may not be a standard amount, the wheel support structures 15a and 15'a can be spaced any desired amount to fit on rails 12 and 12' by the adjustability provided by channel member 105. Thus, in the field, the proper dimensions are ascertained, and the parts 15a, 15'a and 105 are welded into a unit of the proper size, and this unit is thereafter installed on the vehicle.

It can thus be seen that the present invention is manifestly capable of achieving the above objects, and while a preferred embodiment of the present invention has been disclosed, it will be appreciated that it is not limited thereto but may be otherwise embodied within the scope of the following claims.

I claim:

1. A modular wheel suspension comprising a frame mounting plate having a vertical plate portion, a central support member affixed to said frame mounting plate, a pivot shaft bracket support mounted on said central support member, a pivot shaft bracket mounted on said pivot shaft bracket support, an adjustable connection between said pivot shaft bracket support and said pivot shaft bracket, a pivot shaft pivotally mounted on said pivot shaft bracket, a beam arm having a first end mounted on said pivot shaft and a second end displaced laterally from said vertical plate portion, a rubber shear spring having a first side mounted on said vertical plate portion and a second side mounted on said beam arm, and an axle extending outwardly from said second end of said beam arm.

2. A modular wheel suspension as set forth in claim 1 wherein said adjustable connection permits said pivot shaft bracket to be pivoted in a substantially parallel direction relative to said pivot shaft bracket support.

3. A modular wheel suspension as set forth in claim 1 wherein said adjustable connection permits said pivot shaft bracket to have its inclination changed relative to said pivot shaft bracket support.

4. A modular wheel suspension as set forth in claim 1 wherein said adjustable connection permits said pivot shaft bracket to have its inclination changed and moved in a substantially parallel direction relative to said pivot shaft bracket support.

5. A modular wheel suspension as set forth in claim 1 wherein said adjustable connection comprises a plurality of bolts extending between said pivot shaft bracket support and said pivot shaft bracket, and a plurality of apertures in said pivot shaft bracket which are larger than the diameter of said bolts.

6. A modular wheel suspension as set forth in claim 1 wherein said beam arm is a solid block of metal.

7. A modular wheel suspension as set forth in claim 1 including a shock absorber bracket mounted on said beam arm.

8. A modular wheel suspension as set forth in claim 1 wherein said frame mounting plate comprises a horizontal central portion having first and second opposite sides, a flange extending upwardly from one of said sides, and said vertical plate portion extending downwardly from the other of said sides.

9. A modular wheel suspension as set forth in claim 8 including at least one gusset between said horizontal central portion and said vertical plate portion.

10. A modular wheel suspension as set forth in claim 9 including a second gusset spaced from said at least gusset and extending between said horizontal central portion and said vertical plate portion.

11. A modular wheel suspension as set forth in claim 1 including a first spring mounting plate mounted on said frame mounting plate, and a second spring mounting plate mounted on said beam arm, and wherein said rubber shear spring is secured between said first and second spring mounting plates.

12. A modular wheel suspension as set forth in claim 1 including a first alignment aperture in said pivot shaft bracket support, and a second alignment aperture in said pivot shaft bracket for alignment with said first aperture.

13. In a vehicle having first and second spaced frame members, a modular wheel suspension assembly comprising first and second frame mounting plates mounted on said first and second frame members, respectively, first and second central support members affixed to said first and second frame mounting plates, respectively, first and second pivot shaft bracket supports mounted on said first and second central support members, respectively, first and second pivot shaft brackets mounted on said first and second pivot shaft bracket supports, respectively, first and second pivot shafts pivotally mounted on said first and second pivot shaft brackets, respectively, first and second beam arms mounted on said first and second pivot shafts, respectively, a first rubber spring mounted between said first frame mounting plate and said first beam arm, a second rubber spring mounted between said second frame mounting plate and said second beam arm, first and second axles extending outwardly from said first and second beam arms, respectively, and a central coupling member fixedly secured to said first and second central support members.

14. In a vehicle as set forth in claim 13 including a first adjustable connection between said first pivot shaft bracket support and said first pivot shaft bracket, and a second adjustable connection between said second pivot shaft bracket support and said second pivot shaft bracket.

15. In a vehicle as set forth in claim 14 wherein said first and second adjustable connections permit said first and second pivot shaft brackets, respectively, to be pivoted in substantially parallel directions relative to said first and second pivot shaft bracket supports, respectively.

16. In a vehicle as set forth in claim 14 wherein said first and second adjustable connections permit said first and second pivot shaft brackets, respectively, to have their inclinations changed relative to said first and second pivot shaft bracket supports, respectively.

17. In a vehicle as set forth in claim 14 wherein said first and second adjustable connections permit said first and second pivot shaft brackets, respectively, to be pivoted both substantially parallel to and to have their inclinations changed relative to said first and second pivot shaft bracket supports, respectively.

18. In a vehicle as set forth in claim 14 wherein each of said first and second adjustable connections comprise a plurality of bolts coupling said first and second pivot shaft brackets to said first and second pivot shaft supports, respectively, and a plurality of apertures in said first and second pivot shaft brackets which are larger than the diameter of said bolts.

19. In a vehicle as set forth in claim 14 wherein each of said first and second beam arms is a solid block of metal.

20. In a vehicle as set forth in claim 14 including first and second shock absorber brackets mounted on said first and second beam arms, respectively.

21. In a vehicle as set forth in claim 13 wherein each of said first and second frame mounting plates comprises a horizontal central portion having first and second opposite sides, a flange extending upwardly from one of said sides, and a vertical plate portion extending downwardly from the other of said sides.

22. In a vehicle as set forth in claim 21 including at least one gusset between each of said horizontal central portions and each of said vertical plate portions.

23. In a vehicle as set forth in claim 22 including a second gusset spaced from said at least one gusset and extending between each of said horizontal central portions and each of said vertical plate portions.

24. In a vehicle as set forth in claim 13 including a first spring mounting plate mounted on each of said frame mounting plates, and a second spring mounting plate mounted on each of said beam arms, and wherein each of said rubber springs is secured between a first spring mounting plate and a second spring mounting plate.

25. In a vehicle as set forth in claim 13 including a first alignment aperture in each of said first and second pivot shaft bracket supports, and a second alignment aperture in each of said first and second pivot shaft brackets for alignment with each of said first apertures.

26. A modular wheel suspension comprising a frame mounting plate having a vertical plate portion, a pivot shaft bracket support mounted on said frame mounting plate, a pivot shaft bracket mounted on said pivot shaft bracket support, an adjustable connection between said pivot shaft bracket support and said pivot shaft bracket, a pivot shaft pivotally mounted on said pivot shaft bracket, a beam arm having a first end mounted on said shaft and a second end displaced laterally from said vertical plate portion, a rubber shear spring having a first side mounted on said vertical plate portion and a second side mounted on said beam arm, and an axle extending outwardly from a second end of said beam arm.

27. A modular wheel suspension as set forth in claim 26 wherein said adjustable connection comprises a plurality of bolts extending between said pivot shaft bracket support and said pivot shaft bracket, and a plurality of apertures in said pivot shaft bracket which are larger than the diameter of said bolts.

28. A modular wheel suspension as set forth in claim 26 wherein said beam arm is a solid block of metal.

29. A modular wheel suspension as set forth in claim 26 including a shock absorber bracket mounted on said beam arm.

30. A modular wheel suspension as set forth in claim 26 wherein said frame mounting plate comprises a horizontal central portion having first and second opposite sides, a flange extending upwardly from one of said sides, and said vertical plate portion extending downwardly from the other of said sides.

31. A modular wheel suspension as set forth in claim 30 including at least one gusset between said horizontal central portion and said vertical plate portion.

32. A modular wheel suspension as set forth in claim 31 including a second gusset spaced from said at least one gusset and extending between said horizontal central portion and said vertical plate portion.

33. A modular wheel suspension as set forth in claim 26 including a first spring mounting plate mounted on said frame mounting plate, and a second spring mounting plate mounted on said beam arm, and wherein said rubber spring is secured between said first and second spring mounting plates.

34. A modular wheel suspension as set forth in claim 26 including a first alignment aperture in said pivot shaft bracket support, and a second alignment aperture in said pivot shaft bracket for alignment with said first aperture.

35. A modular wheel suspension assembly comprising first and second frame mounting plates, first and second vertical plate portions on said first and second frame mounting plates, respectively, a central support member having opposite ends secured to said first and second frame mounting plates, first and second pivot shaft bracket supports secured to opposite ends of said central support member, first and second pivot shaft brackets mounted on said first and second pivot shaft bracket supports, a first adjustable connection between said first pivot shaft bracket support and said first pivot shaft bracket, a second adjustable connection between said second pivot shaft bracket support and said second pivot shaft bracket, respectively, first and second pivot shafts pivotally mounted on said first and second pivot shaft brackets, respectively, first and second beam arms mounted on said first and second pivot shafts, respectively, a first rubber shear spring mounted between said first vertical plate portion and said first beam arm, a second rubber shear spring mounted between said second vertical plate portion and said second beam arm, and first and second axles extending outwardly from said first and second beam arms, respectively.

36. In a vehicle as set forth in claim 35 including a first alignment aperture in each of said first and second pivot shaft bracket supports, and a second alignment aperture in each of said first and second pivot shaft brackets for alignment with each of said first apertures.

37. A modular wheel suspension comprising a mounting plate, a pivot shaft, a beam arm mounted on said pivot shaft, a rubber shear spring mounted between said mounting plate and said beam arm, a wheel mounted on said beam arm, and means mounted between said mounting plate and said pivot shaft for adjusting the toe of said wheel.

38. A modular wheel suspension as set forth in claim 37 including means for adjusting the camber of said wheel.

39. A modular wheel suspension comprising a mounting plate, a pivot shaft, a beam arm mounted on said pivot shaft, a rubber shear spring mounted between said mounting plate and said beam arm, a wheel mounted on said beam arm, and means mounted between said mounting plate and said pivot shaft for adjusting the camber of said wheel.

* * * * *

UNITED STATES PATENT AND TRADEMARK OFFICE
CERTIFICATE OF CORRECTION

PATENT NO. : 5,899,470
DATED      : May 4, 1999
INVENTOR(S): David E. Heitzmann

It is certified that error appears in the above-identified patent and that said Letters Patent is hereby corrected as shown below:

Column 10, line 13 (claim 36), change "In a vehicle" to
--A modular wheel suspension--.

Signed and Sealed this

Seventh Day of September, 1999

Attest:

Q. TODD DICKINSON

*Attesting Officer*     *Acting Commissioner of Patents and Trademarks*